(12) United States Patent
Yokoyama et al.

(10) Patent No.: US 7,762,672 B2
(45) Date of Patent: Jul. 27, 2010

(54) DATA PRESENTATION APPARATUS AND OPERATION METHOD OF TERMINAL

(75) Inventors: Junichi Yokoyama, Saitama (JP); Naoki Yamaguchi, Saitama (JP)

(73) Assignee: Fujinon Corporation, Saitama-shi (JP)

( * ) Notice: Subject to any disclaimer, the term of this patent is extended or adjusted under 35 U.S.C. 154(b) by 948 days.

(21) Appl. No.: 11/487,996

(22) Filed: Jul. 18, 2006

(65) Prior Publication Data

US 2007/0040993 A1 Feb. 22, 2007

(30) Foreign Application Priority Data

Jul. 19, 2005 (JP) .......................... P2005-208821
Jul. 22, 2005 (JP) .......................... P2005-213137

(51) Int. Cl.
*G03B 21/00* (2006.01)
(52) U.S. Cl. .............................. 353/42; 353/28; 353/44; 345/173; 345/175; 345/178; 345/156; 345/157; 348/87; 348/144; 348/E5.137; 348/211.99; 348/211.1
(58) Field of Classification Search ................... 353/42, 353/44, 28; 345/178, 175, 173, 156, 157, 345/158, 159, 160, 161, 162, 163, 164, 165, 345/166, 167, 168, 169, 170, 171, 172, 174, 345/176, 177, 179, 180, 181, 182, 183, 184; 348/87, 744, E5.137, 211.99, 211.1, 211.2, 348/211.3, 211.4, 211.5, 211.6, 211.7, 211.8, 348/211.9, 211.11, 211.12, 211.13, 211.14
See application file for complete search history.

(56) References Cited

U.S. PATENT DOCUMENTS 7,284,866 B2 * 10/2007 Buchmann .................... 353/42

FOREIGN PATENT DOCUMENTS

| JP | 3-119478 A | 5/1991 |
|----|------------|--------|
| JP | 2001-022519 A | 1/2001 |
| JP | 2003-216322 A | 7/2003 |
| JP | 2004-259090 A | 9/2004 |

* cited by examiner

*Primary Examiner*—Georgia Y Epps
*Assistant Examiner*—Sultan Chowdhury
(74) *Attorney, Agent, or Firm*—Birch, Stewart, Kolasch & Birch, LLP

(57) ABSTRACT

A data presentation apparatus having a function to generate a pointer image pointing a position in a presentation image is provided and includes: an image transmission section that transmits an image data of the presentation image to a terminal; a receiver that receives a control signal to determine a display position of the pointer image in the presentation image, the control signal being transmitted from the terminal; and an image generation section that generates an image data of a composite image based on the control signal, the composite image including the presentation image and the pointer image displayed in the presentation image.

8 Claims, 5 Drawing Sheets

DATA PRESENTATION APPARATUS AND OPERATION METHOD OF TERMINAL

FIELD OF THE INVENTION

The present invention relates to data presentation apparatus used for presentation or training with an image presented and a technique for controlling the display position of a pointer image that points a part of the presentation image.

BACKGROUND OF THE INVENTION

An approach is known for projecting data such as a chart on a screen and performing presentation while pointing the data. The approach is used for explanation in conference or class in many cases. In this approach, a data presentation apparatus is used as a device for imaging data.

A data presentation apparatus is also called a calligraphic work and painting camera. A basic function of the data presentation apparatus is to capture a data image with an imaging device. The captured image is projected on a screen. Presentation is performed while the captured image is being shown to a viewer.

A technique is known for displaying a pointer image such as an arrow in a presentation image and moving the display of the pointer image as required in a presentation using data to point an arbitrary position of the presentation image thus effectively performing the presentation.

In this technique, processing is made to optically detect that the presenter has pointed a position in a presentation image and display a pointer image in a position corresponding to the detected position in the presentation image (for example, refer to JP-A-2003-216322).

A technique has been also proposed for controlling a pointer image displayed in a presentation image by using a portable information processing terminal (PDA (Personal Digital Assistant)) available on the market (for example, refer to JP-A-2004-259090).

To be more specific, when a touch panel on a portable information processing terminal is pressed with a pointing pen, an indicated position signal used to indicate a position in the presentation image corresponding to the pressed position is transmitted to data presentation apparatus. The data presentation apparatus synthesizes a pointer image into a position in the presentation image and displays the presentation image including the pointer image on a screen. In this way, by operating the pointer image displayed on the screen with a portable terminal, it is possible to indicate a desired position in the displayed image of data on the screen.

The related art technology described in the JP-A-2003-216322 requires a dedicated pointing device to identify the display position of a pointer image. This gives a user an impression of the product being comparatively expensive or sense of demerit of requiring a dedicated device. Further, the technique needs to optically read the pointing position in the presentation image indicated by the presenter thus restricting the standing position of the presenter.

The method that uses a portable information processing terminal as a pointing device described in JP-A-2004-259090 performs synthesis of a pointer image and a presentation image in the portable information processing terminal so that it involves a greater load on the portable information processing terminal with limited arithmetic operation speed and memory capacity. This technique is inconvenient to the user since it is likely to cause troubles such as operation failure and poor response.

The compact monitor of a portable information processing terminal often has a different aspect ratio from that of a regular screen. For example, the monitor may be portrait-oriented. In pointing on the monitor screen, the relationship between a pointed position and the pointed position on the presented screen projected on the screen by a projector is hard to understand thus resulting in complicated pointing operation.

The data presentation apparatus in the related art can display only one pointer image in the image of data. Thus, both a presenter and a viewer cannot simultaneously indicate desired positions by using a pointer image.

SUMMARY OF THE INVENTION

An object of an illustrative, non-limiting embodiment of the invention is to provide, in a technique for performing presentation while displaying a pointer image in a presentation image, cost-competitiveness, user's convenience by the use of a device on the market, elimination of constrains on the standing position of a presenter in the presentation, and a technique for facilitating the pointing operation.

Another object of an illustrative, non-limiting embodiment of the invention is to provide data presentation apparatus that allows a presenter and a viewer to simultaneously indicate desired positions by using indication means.

An aspect of the present invention provides a data presentation apparatus having a function to generate a pointer image pointing a position in a presentation image, the data presentation apparatus comprising: an image transmission section that transmits an image data of the presentation image to a terminal; a receiver that receives a control signal to determine a display position of the pointer image in the presentation image, the control signal being transmitted from the terminal; and an image generation section that generates an image data of a composite image (synthesized image) based on the control signal, the composite image comprising the presentation image and the pointer image displayed in the presentation image.

According to the data presentation apparatus, an image data of a presentation image is transmitted to a terminal, and the terminal uses the image data to generate a control signal used to determine a display position of a pointer image, and the control signal is transmitted back to the data presentation apparatus. The data presentation apparatus determines the display position of the pointer image and generates a presentation image with which the pointer image is synthesized.

According to an aspect of the invention, it is possible to use as a terminal a portable information processing terminal (PDA (Personal Digital Assistant)) available on the market to control the display position of a pointer image. In this case, a PDA including an image monitor equipped with a touch-panel mechanism is used.

In this case, a presenter performs presentation with a PDA in his/her hand. On this occasion, the image data of an image presented (for example, projected on a screen) by using data presentation apparatus is transmitted from the data presentation apparatus to the PDA, which displays the image on its monitor (display section). Preferably, on this occasion, the data presentation apparatus reduces the size of the image to the display size of the PDA, and transmits the image data of the reduced image to the PDA. In this way, it is possible to reduce the data volume of transfer data and shorten the communication time. The presenter touches with a touch pen the part of the image displayed on the PDA to specify the display position of the pointer image. The PDA identifies the position indicated by the touch pen and generates a control signal used to specify the position in the presentation image.

The control signal is transmitted back to the data presentation apparatus. The data presentation apparatus determines the display position of the pointer image and generates image data into which the pointer image is synthesized so that the pointer image will be displayed in the specified position. The image data is transmitted to, for example, a projector (display device) and projected on a screen or the like. In this way, a presented data image including a pointer image of an arrow displayed is presented to a viewer. The presenter uses a touch pen to perform presentation with a terminal in his/her hand while controlling the display position of the pointer image.

With this mechanism, it is not necessary to separately provide a dedicated pointing device but to provide a commercially available PDA with a program executing the above processing installed. This reduces the introduction cost.

The presenter may use a touch pen to specify the display position of a pointer image on the display screen while watching the monitor of the terminal. As long as communications between the terminal and the data presentation apparatus are secured, the standing position of the presenter is not restricted.

Preferably, the data presentation apparatus according to an aspect of the invention comprises an imaging device for capturing presented data and the presentation image is captured by the imaging device. With this aspect, it is possible to capture the provided data with the imaging device included in the data presentation apparatus and present its image to a viewer, and control the pointer image displayed in the presentation image with the terminal at hand while performing the presentation.

An aspect of the invention may be understood as an operation method of a terminal for transmitting a control signal used to control the position of a pointer image. That is, an aspect of the invention provides a method for operating a terminal for transmitting a control signal of a display position of a pointer image in a presentation image to a data presentation apparatus, the data presentation apparatus having a function to generate the pointer image pointing a position in the presentation image, the method comprising: receiving an image data of the presentation image from the data presentation apparatus; displaying an image on a display section of the terminal based on the image data; generating the control signal to determine the display position of the pointer image in the presentation image; and transmitting the control signal to the data presentation apparatus.

According to an aspect of the operation method of a terminal, it is possible to acquire the advantage acquired when position control of a pointer image using the PDA. To accomplish the operation method of a terminal, a program to execute the above procedure need only be installed in a commercially available PDA.

Preferably, the operation method of a terminal further comprises displaying a pointing area on the display section of the terminal, the pointing area corresponding to an area available for displaying the pointer image in the presentation image; and detecting a coordinate of a point specified in the pointing area and converting the coordinate of the point to a coordinate of the pointer image in an image generated by the data presentation apparatus.

According to this aspect, even in case the aspect ratio of the monitor screen of the terminal differs from that of a screen displayed from the data presentation apparatus via a projector, a pointing-available range is displayed on the terminal monitor. This allows a presenter to readily recognize the pointing-available range thus enhancing the pointing operability. Especially in presentation, the presenter must perform pointing while giving explanation so that it is convenient to be able to recognize a pointing-available range at a glance.

The range where a pointer image is read is limited, which eliminates the need for useless arithmetic operation in identifying a specified position. This reduces the load on the terminal thus avoiding a processing delay and unintended processing stoppage (freeze state that accompanies error processing).

A data presentation apparatus according to another aspect of the invention comprises: a plurality of indication sections (terminals) for outputting indicated position signals (control signals) used to indicate (determine) positions in the image of data (i.e., the presentation image) displayed on a display device and identification signals used to discriminate between the indicated position signals; and a control section for recognizing an indicated position signal output with the identification signals per identification signal, the control section controlling the display device to display pointer images in respective positions based on the recognized indicated position signals.

The data presentation apparatus according to an aspect of the invention recognizes, per identification signal output from the indication sections, an indicated position signal output together with the identification signal and displays a pointer image in each position in the image of data based on each recognized indicated position signal. Thus, in a presentation, a presenter and a viewer are able to simultaneously indicate desired positions by operating pointer images corresponding to respective indication section by using the indication means. This assures a presentation that may be progressed bi-directionally thus smoothly progressing a presentation.

The pointer images may be of various types. For example, the pointer images preferably have different colors and/or shapes from each other. In such an aspect, it is easy to discriminate between pointer images.

In case pointer images have different colors and/or shapes from each other, it is possible to automatically assign the colors of pointer images. For example, the control section can control the display device to display a pointer image generated based on an indicated position signal output from an indication section in a different color from the color of a pointer image displayed based on the indicated position signal from other indication section. In this case, it is preferable to select a color that is visually discriminated with ease. For example, an easy-to-discriminate color may be previously stored in storage means in the apparatus as color table data.

The control section can change the color and/or shape of a pointer image on a per indication section basis. For example, in case a plurality of users have selected pointer images of the same color and shape on respective indication section, the controller may choose to change the color and shape of the pointer images and display the pointer images so that the pointer images corresponding to the indication section can be discriminated from each other, or to display a plurality of pointer images by using a single pointer image operable on each indication section as a representative pointer image. This approach provides a variety of presentations.

The data presentation apparatus can execute a drawing function on top of the pointing function. For example, the control section can display an image tracing positions in the image of data based on each indicated position signal output from the identified indication section.

According to an aspect of the invention, it is possible to use a commercially available PDA to control the display position of a pointer image. Even in case the PDA screen is small and its aspect ratio differs from that of the presented screen, it is possible to efficiently perform pointing using a pointer image by displaying the pointing range on the PDA screen. In this way, in a presentation technique displaying a pointer image in a presentation image, it is possible to obtain advantages: (1) cost effectiveness; (2) user's convenience by the use of a commercially available device; (3) elimination of restrictions on the standing position of a presenter in a presentation; (4) pointing operation made easy.

DETAILED DESCRIPTION OF THE INVENTION

(1) First Embodiment

1-1. Configuration of the First Embodiment

Figure 1:
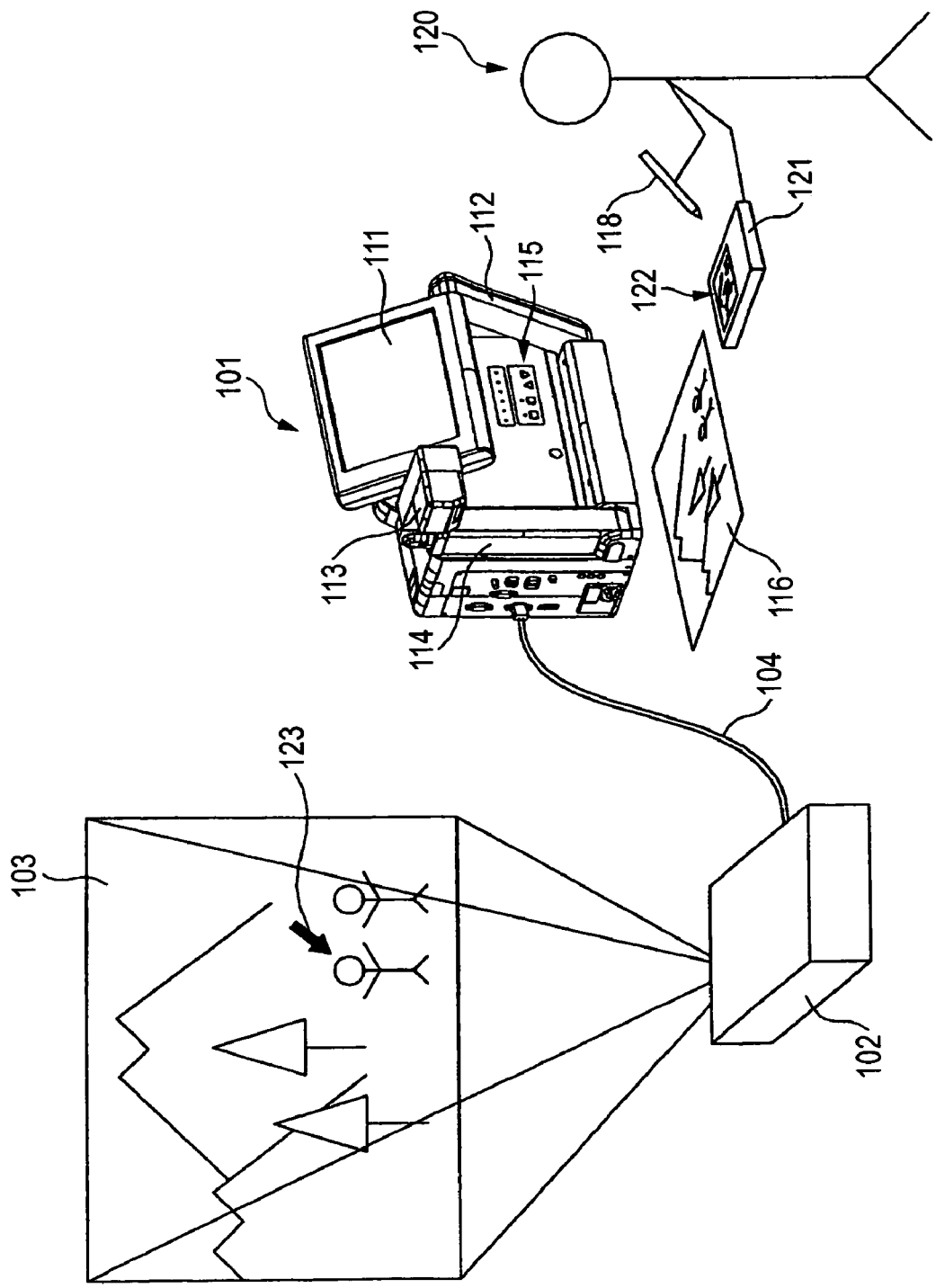
FIG. 1 is a conceptual drawing showing the outline of an illustrative presentation system.

FIG. 1 is a conceptual drawing showing the outline of a presentation system according to an exemplary embodiment of the invention. FIG. 1 shows data presentation apparatus 101, a projector 102, a screen 103, an image transmission cable 104, presented data 116, a touch pen 118, a portable information processing terminal (PDA) 121 and a presenter 120.

The data presentation apparatus 101 comprises a display 111, a display support arm 112, an imaging device equipped with a CCD camera 113, a camera support arm 114, and operation means 115.

The data presentation apparatus 101 comprises a function to capture the data 116 by way of the imaging device 113 and transmit the image data to the projector 102, a function to transmit the image data to the portable information processing terminal 121, a function to store the image data in an internal storage, and a function to read the stored image data as required and transmit the image data to the projector 102 and the portable information processing terminal 121. The data presentation apparatus 101 has a function to synthesize a pointer image such as an arrow into the image of the data 116 based on an indication signal from the portable information processing terminal 121 and transmit the image data of the composite image to the projector 102.

The display 111 is supported by the display support arm 112 so that the elevation angle of the display surface can be controlled. The display 111 has a function to display the image captured by the imaging device 113 and a function to display various data and operation details. The imaging device 113 is used to capture the data 116 and is supported by the imaging device support arm 114 so as to allow adjustment of an imaging direction or angle of view. The operation means 115 is used to control the operation of the data presentation apparatus 101 and includes a power switch and various mode setting switches as well as a switch for scaled display of a presentation image.

The portable information processing terminal 121 is a commercially available PDA and includes an input device-monitor 122. The input device-monitor 122 includes a liquid crystal display and a touch panel function as described later and allows display of various image data, operation using a touch pen in contact with the panel and data input. The input device-monitor 122 displays the captured image of the data 116 captured by the imaging device 113.

The touch pen 118 uses the touch panel function of the input device-monitor 122 to perform various operations using the portable information processing terminal 121. The touch pen 118 is a pen-shaped member used to apply pressure on a part of the display surface.

It is possible to perform pointing (action to point a part using a pointer image 123 such as an arrow) in a presentation by using a touch pen 118. That is, the captured image of the data 116 is displayed on the input device-monitor 122. By touching an arbitrary part thereof with the touch pen 118, it is possible to display a pointer image 123 in a corresponding position on the screen 103. By shifting the position on the input device-monitor 122 where the touch pen 118 is in contact, it is possible to move the display of the pointer image 123 on the screen 103.

Figure 2:
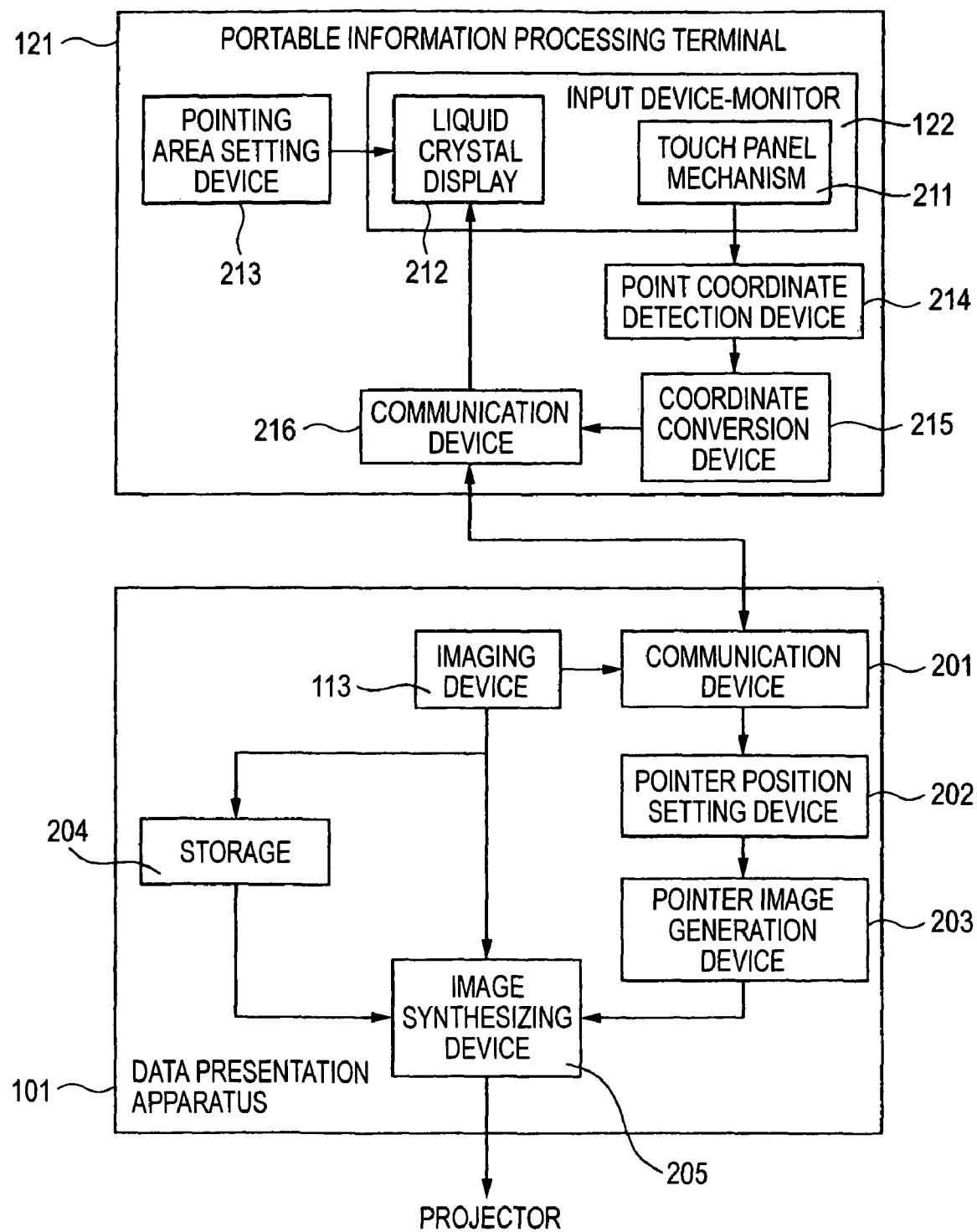
FIG. 2 is a block diagram showing an exemplary embodiment of a data presentation apparatus and a portable information processing terminal.

FIG. 2 is a block diagram showing the outline of the data presentation apparatus 101 and the portable information processing terminal 121. The data presentation apparatus 101 comprises an imaging a device 113, a communications device 201, a pointer position setting device 202, an image generation device 203, a storage 204 and an image synthesizing device 205.

The imaging device 113 has a built-in CCD camera. The imaging device 113 picks up the data 116 (refer to FIG. 1) and outputs its captured image data to the communications device 201, the storage 204 and the mage synthesizing device 205. The communications device 201 has a function to transmit the data (image data) of an image captured by the imaging device 113 to the communications device 216 of the portable information processing terminal 121 and a function to receive a control signal used to determine the display position of a pointer image transmitted from the communications device 216. Communications are made by way of radio standards using a microwave.

The pointer position setting device 202 sets the coordinates of a pointer position (position where pointing was made) based on the control signal used to determine the display position of a pointer image transmitted from the portable information processing terminal 121. The pointer image generation device 203 generates an image signal used to display a pointer image (for example an arrow image) at coordinates set by the pointer position setting device 202. The storage 204 stores the image data of an image captured by the imaging device 113, reads the image data as required and transmits the image data to the image synthesizing device 205. The image synthesizing device 205 synthesizes a pointer image into the image of presented data and generates an image of the presentation image including the pointer image.

The portable information processing terminal 121 includes an input device-monitor 122 equipped with a touch panel mechanism 211 and a liquid crystal display 212, a pointing area setting device 213, a point coordinate detection device 214, a coordinate conversion device 215, and a communications device 216.

The touch panel mechanism 211 that is arranged over the display screen of the liquid crystal display 212 outputs a signal used to identify the pressed position on the display by way of the function of a pressure sensor.

The pointing areas setting device 213 is image generation means for performing display (such as display of frame) indicating an area (pointing area) where pointing is available by using a touch pen 118 (refer to FIG. 1) on the display screen of the liquid crystal display 212. Display of the pointing area works as a guideline display that shows the range where pointing is available by using the touch pen 118.

The shape of the pointing area may be a rectangular shape of an aspect ratio of 3:4. In case the shape of the display screen of the input device-monitor 122 of the portable information processing terminal 121 (display screen of the liquid crystal display 212) is portrait, it is possible for a presenter 120 to readily grasp the actually effective pointing area by making the pointing area landscape to the shape of a projected screen on the screen 103, thus doing without useless pointing operation. It is possible for the presenter to recognize the effective pointing range on the terminal, thus enhancing the operability of the terminal as a pointing device.

The point coordinate detection device 214 receives output from the touch panel mechanism 211 and calculates coordinates used to identify the position on the liquid crystal display 212 pressed by the touch pen 118. The coordinate conversion device 215 converts the coordinates of a point position obtained by the point coordinate detection device 214 to coordinates on the screen projected on the screen 103 (refer to FIG. 1). This coordinate conversion is made because, in general, the aspect ratio of the display screen of the input device-monitor 122 differs from that of the screen projected on the screen 103.

The communications device 216 transmits to the communications device 201 of the data presentation apparatus 101 the data of the coordinates where the pointer image output from the coordinate conversion device 215 should be displayed. The communications device 216 receives the image data of the data 116 (refer to FIG. 1) transmitted from the data presentation apparatus 101 and transmits the image data to the liquid crystal display 212 of the input device-monitor 122.

In the data presentation apparatus 101, an image reduction device for converting an image captured by the imaging device 113 to a reduced image matching the size of the display screen of the liquid crystal display 212 of the portable information processing terminal 121 may be arranged between the imaging device 113 and the communications device 201. By using this image reduction device, it is possible to transmit a reduced image matching the size of the liquid crystal display to the portable information processing terminal 121 and transmit the image data of the reduced image from the communications device 201 to the communications device 216. In this way, it is possible to reduce the data volume of transfer data from the data presentation apparatus 101 to the portable information processing terminal 121 thus reducing the communication tine and the load on the portable information processing terminal. This is advantageous in terms of boosting the system operation.

1-2. Operation of the First Embodiment (1)

An example of system operation will be described referring to FIGS. 1 and 2. In this example, data is captured by data presentation apparatus 101 and the captured image is projected from a projector 102 on a screen 103. On that occasion, a pointer image 123 whose display position is controlled by a user 120 is overlaid on the image of data 116 displayed on the screen 103.

With the devices powered on, the data 116 to be presented is placed under an imaging device 113 and the data 116 is captured by the imaging device 113. The imaging device 113 transmits the imaging data of the data 116 to a communications device 201 and an image synthesizing device 205.

In this stage, pointing using a pointer image is not performed. The image data of the data 116 is transmitted to a projector 102 without image synthesis of the pointer image being performed by the image synthesizing device 205. The projector 102 projects and displays the image of the data 116 on the screen 103 based on the image data.

The communications device 201 transmits the image data to the communications device 216, which transmits the image data to the liquid crystal display 212. The liquid crystal display 212 displays the image of the data 116 based on the image data. On the liquid crystal display 212 of an input device-monitor 122 is also displayed a frame used to determined the pointing area by way of the function of a pointing area setting device 213.

In this state, when the presenter 120 taps the tip of a touch pen 118 on an arbitrary part of the image of the data 116 displayed on the input device-monitor 122, the position is read by a touch panel mechanism 211. The coordinates of the position pointed by the touch pen 118 is calculated by a point coordinate detection device 215. Then the coordinate data is converted to coordinate data used on the screen 103 by the coordinate detection device 215.

On this occasion, operation for control of the display position of the pointer image is executed in the pointing area displayed on the input device-monitor 122. The operation does not take place except in the pointing area.

A control signal used to determine the display position of a pointer image on the screen 103 is transmitted from the coordinate conversion device 215 to the communications device 216 and then to the communications device 201 of the data presentation apparatus 101. This control signal is transmitted from a communications device 201 to a pointer position setting device 202, where a position to display the pointer image is calculated. A pointer image generation device 203 generates in this position image data displaying the pointer image of an arrow display in this position and transmits the image data to an image synthesizing device 205.

The image synthesizing device 205 synthesizes the pointer image generated by the pointer image generation device 203 into the captured image of the data 116 transmitted from the imaging device 113 (or a storage 204) and transmits the composite image data to the projector 102. The projector 102 projects the composite image on the screen 103. In this way, the image of the data 116 including the pointer image 123 is projected on the screen 103.

When the presenter 120 moves the tip of the touch pen 118 while it is in contact with the input device-monitor 122, travel of the contact part of the touch pen is read by the touch panel 211 and processing is made via the above path causing the display position of the pointer image 123 on the screen 103 to move. The presenter 120 thus manipulates the touch pen 118 to control the display position of the pointer image 123 on the screen 103.

On this occasion, the presenter 120 can point an arbitrary part in the displayed image of the data 116 by the touch pen 118 while watching the image of the data 116 on the input device-monitor 122. The presenter 120 is thus able to perform presentation using a presentation image without watching the screen 103, his/her posture or orientation being restricted.

Image synthesis is not made in the portable information processing terminal 121, which reduces the load on the portable information processing terminal 121 and allows a quick response. The reduced load suppresses inconvenience such as slow or delayed operation even when another application software program is installed in the portable information processing terminal 121 or volume data is stored.

The pointing area where pointing is available is displayed on the monitor of the input device-monitor 122 (monitor of the liquid crystal display 212). Thus it is easy for the presenter 120 to perform pointing by using the touch pen 118. Further, useless arithmetic operation in the portable information processing terminal 121 such as in case the presenter has pointed a position that cannot be displayed on the screen 103 is eliminated. This helps reduce the load on the portable information processing terminal 121.

In case there are multiple items of data 116, the data 116 should be replaced with another item of data and the above operation should be repeated.

1-3. Operation of the First Embodiment (2)

In the system shown in FIG. 1, the image data of data 116 may be previously stored in the data presentation apparatus 101 and a presentation may be performed with the image data is being read as required. In this case, the data to be previously presented is captured using the imaging device 113 and its image data is stored in the storage 204 in the data presentation apparatus 101. Arrangement should be made so that it is possible to transmit image data from the storage 204 to the communications device 201 and that it is possible to read a image selected on the portable information processing terminal 121 from the storage 204.

Before a presentation starts, a group of thumbnail images (reduced images) of an image group to be used in the presentation is displayed on the input device-monitor 122. From the group of thumbnail images, the presenter selects a desired image by using the touch panel mechanism 211 in the input device-monitor 122. The image data of the original image corresponding to the selected thumbnail image is read from the storage 204 and transmitted from the data presentation apparatus 101 to the projector 102. Then the image is projected on the screen 103 from the projector 102.

In this case also, the same image of data projected on the screen 103 is displayed on the input device-monitor 122, thus allowing position control of the pointer image 123 using the touch pen 118.

(2) Second Embodiment

A typical personal computer may be used as data presentation apparatus 101. In this case, a program to execute the operation described in the first embodiment is installed in the personal computer. The image data captured with a digital camera is captured into the personal computer. Then, same as the procedure described in the first embodiment, the portable information processing terminal 121 is used as a pointing device to perform pointing of the presentation image.

In this embodiment, it is possible to previously store the image data of a presentation image in a personal computer or an external storage and operate the portable information processing terminal 121 to read the image data as required and project and display the read image data on the screen 103 from the projector 102. In this case also, it is possible to control the display position of the pointer image 123 by operating the portable information processing terminal 121.

This embodiment has a convenience that a personal computer and a portable information processing terminal available on the market need only be provided as hardware components.

(3) Configuration of a Third Embodiment

Figure 3:
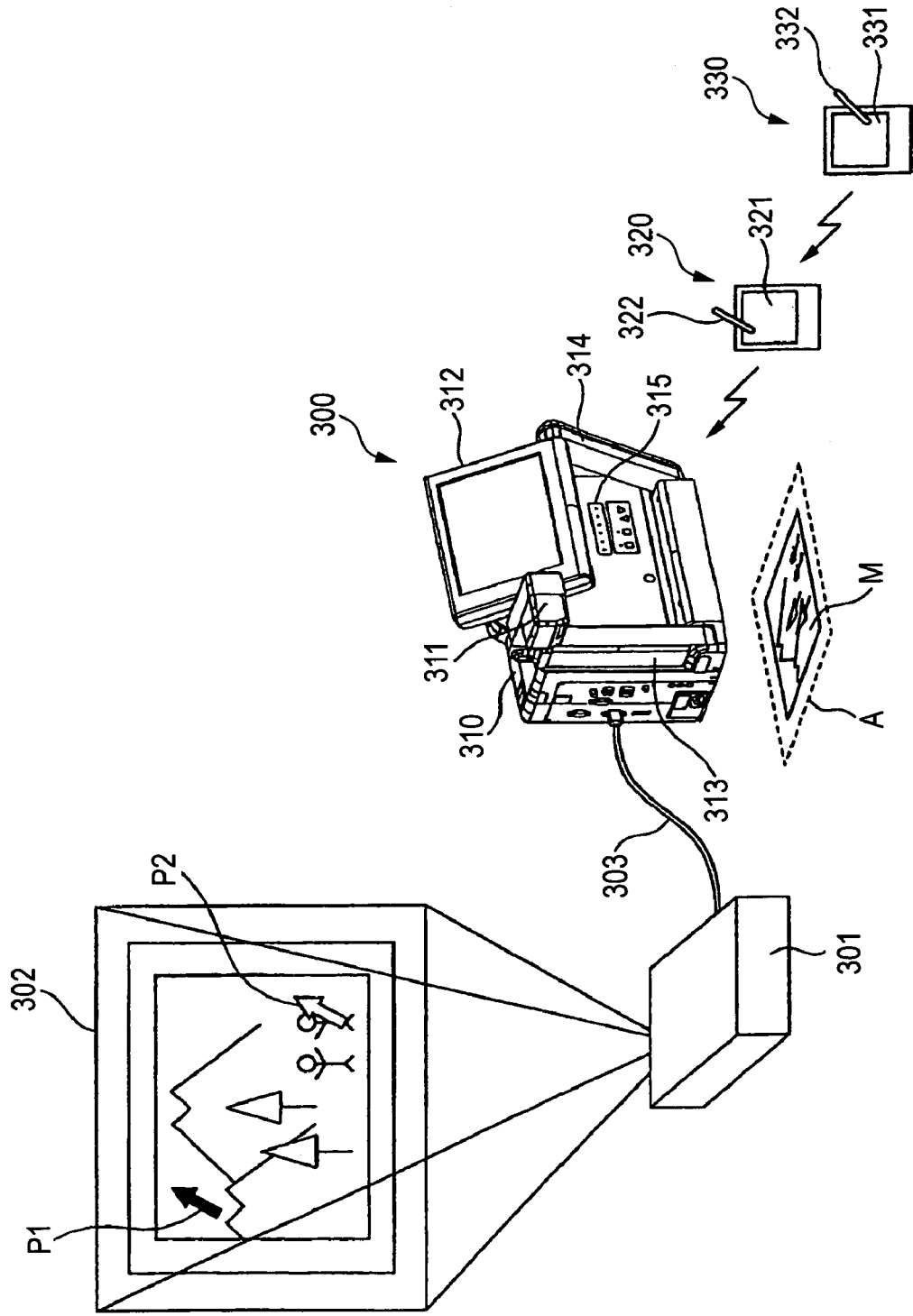
FIG. 3 is a schematic perspective view showing a presentation system to which a data presentation apparatus according to an exemplary embodiment of the invention is applied.
Figure 4:
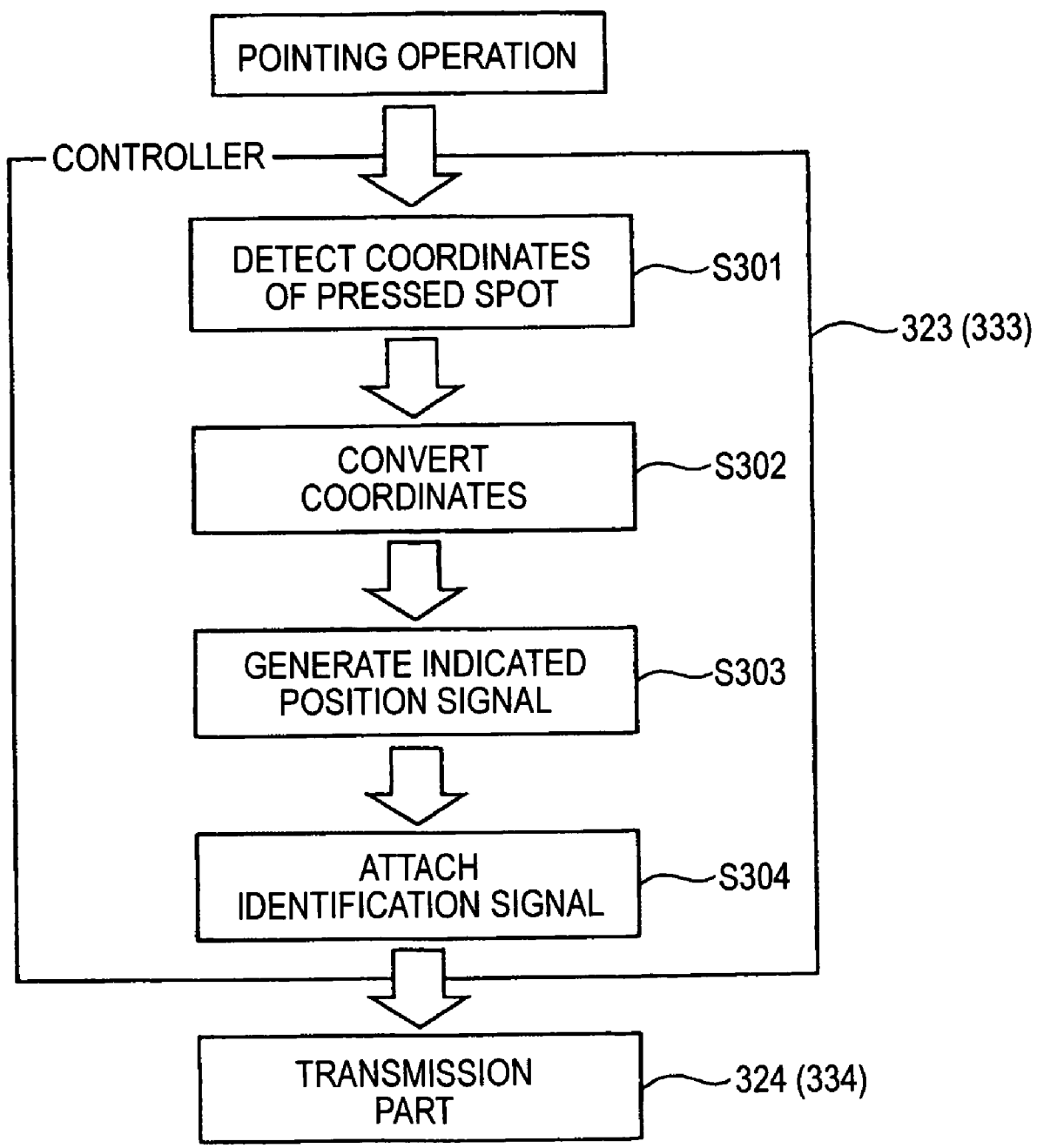
FIG. 4 is a block diagram systematically showing the configurations and functions of a indication section of a data presentation apparatus according to an exemplary embodiment of the invention.
Figure 5:
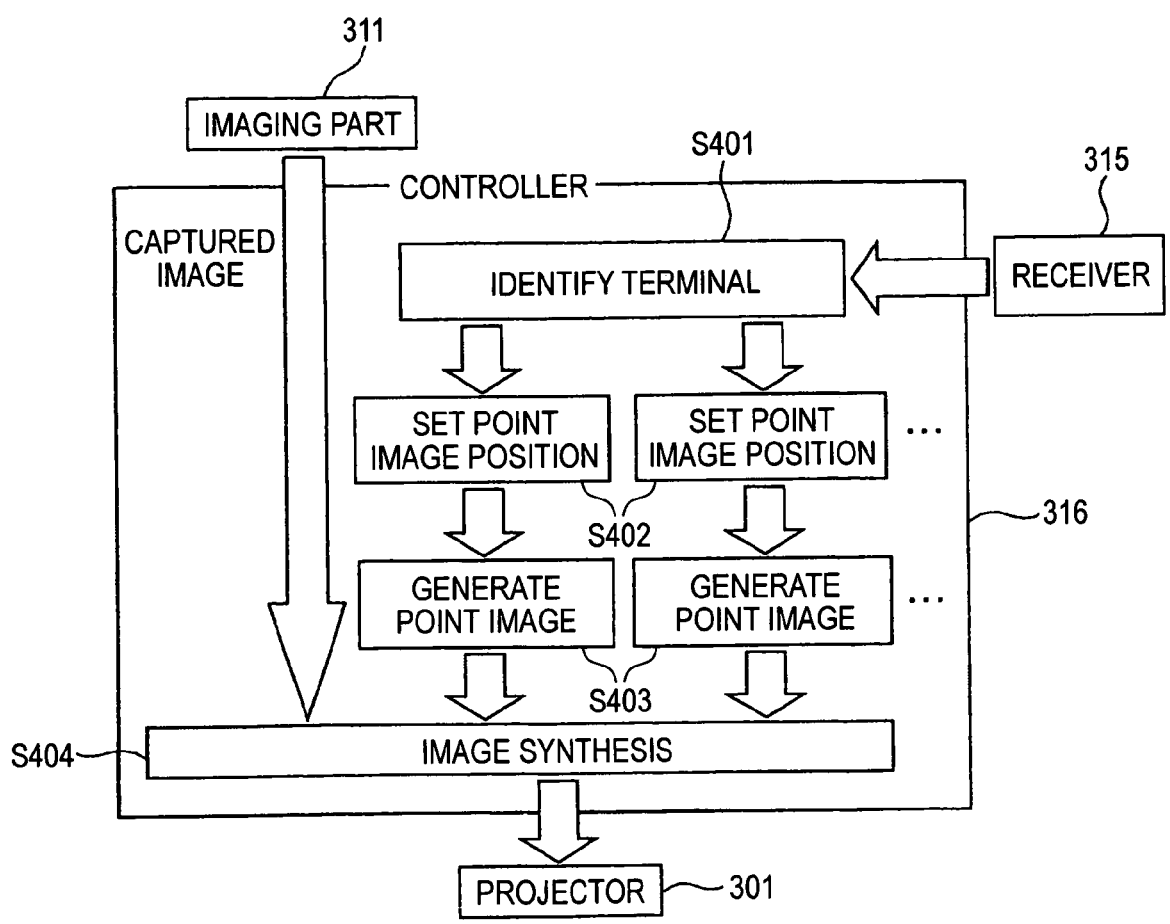
FIG. 5 is a block diagram systematically showing the configuration and function of a data presentation apparatus according to an exemplary embodiment of the invention.

An exemplary third embodiment of the invention will be described referring to drawings. FIG. 3 is a schematic view showing the whole of a presentation system to which data presentation apparatus 300 according to an exemplary embodiment of the invention is applied. FIG. 4 is a block diagram systematically showing the configuration and function of the portable terminal 320, 330 of the data presentation apparatus 300. FIG. 5 is a block diagram systematically showing the configuration and function of the data presentation apparatus 300.

The presentation system comprises data presentation apparatus 300 including a controller (control section) 316 for performing image processing (shown in FIG. 5 alone) provided in a main body 310. Image processing by the controller 316 synthesizes the pointer images P1, P2 into an image in accordance with the operation of the portable terminals (indication section) 320, 330. The data presentation apparatus 300 has a liquid crystal projector 301 for projecting an image processed by the controller 316 connected via an image transfer cable 303. An image projected from the projector 301 is displayed on a screen 302.

The data presentation apparatus 300 comprises a main body 310. The main body 310 includes an imaging part 311, a display 312, and a receiver 315. The imaging part 311 is supported by a camera support arm 313 so that its photography direction and angle of view may be adjusted. Inside the imaging part 311 are provided a CCD camera for motion picture photography and a lens arranged below the CCD camera at a space. The display (display section) 312 is supported by a display support arm 314 so that its elevation angle and top/bottom position may be adjusted. The display 312 may be a pressure-sensitive liquid crystal display. The display 312 displays an image captured by the imaging part 311 and has a function as a touch panel used for various operations. The receiver 315 receives an indicated position signal and an identification signal transmitted from the portable terminals 320, 330 described below. The signal receiving system of the receiver 315 corresponds to the signal originating system of the portable terminals 320, 330.

Inside the main body 310 is provided a controller 316 for performing image processing of an image captured by the imaging part 311. Image processing by the controller 316 synthesizes the pointer images P1, P2 into a captured image for example in accordance with the operation of the portable terminals 320, 330. The pointer images P1, P2 have different colors from each other in an example. In this case, the pointer images P1, P2 may have different shapes from each other. Shapes of the pointer images P1, P2 include an arrow, a circle, a point, and a triangle. The image data of a captured image image-processed by the controller 316 is output to a projector 301 via an image transfer cable 303. The captured image projected from the projector 301 is displayed on the screen 302. The controller 316 is capable of outputting the image data of the captured image on the display 312 and may display a captured image on the display 312 as required.

The controller 316 can execute a drawing function on top of the pointing function. In particular, the controller 316 can display an image tracing positions in the image of a manuscript M.

On the upper surface of the portable terminals 320, 330 are provided touch panels 321, 331. The touch panels 321, 331 are operated by a press of pointing pens 322, 332. Inside the touch panels 321, 331 are provided controller 323, 333 (shown in FIG. 4 alone) for detecting the coordinate position of a pressed part of the touch panels 321, 331. The controllers 323, 333 convert a detected coordinate position to a coordinate position in the captured image, generate indicated position signals for indicating the coordinate position to the controller 316 of the data presentation apparatus 300, and attach identification signals used to discriminate the indicated position signals of the portable terminals 320, 330 from each other to the generated indicated position signals. On the front side surface of the portable terminals 320, 330 are provided transmission parts 324, 334 (shown in FIG. 4 alone) for originating indicated position signals and identification signals. Signal originating systems employed by the indicated position signals and identification signals from the transmission parts 324, 334 include an infrared system for wirelessly emitting infrared light and a wireless system for transmitting wireless signals. The identification signals of the portable terminals 320, 330 are superimposed on the indicated position signals for example through modulation of frequencies of the indicated position signal so that the indicated position signals transmitted together with the identification signals will be different from each other.

(4) Operation of the Embodiment

Next, operation of the data presentation apparatus 300 assumed when a presenter operates the portable terminal 320 and a viewer operates the portable terminal 330 will be described mainly referring to FIGS. 4 and 5. As shown in FIG. 3, the presenter (not shown) places data (for example a manuscript M) below the imaging part 311 and uses the imaging part 311 to photograph the manuscript M in a presentation. The captured image of the manuscript M is captured into the controller 316 and processed into a still image there. The image data of the captured image of the manuscript M is output to the projector 301 via the image transfer cable 303. The captured image projected from the projector 301 is displayed on the screen 302. In FIG. 3, a photography range by the imaging part 311 is shown by a photography area A. On the screen 302 are displayed the image of the photography area A and the captured image of the manuscript M.

Next, the presenter operates the portable terminal 320 to display the pointer image P1 in the image of the manuscript M on the screen 302 and indicates a desired spot by using the pointer image P1. On the other hand, a viewer operates the portable terminal 330 to display the pointer image P2 in the image of the manuscript M on the screen 302 and indicates a desired spot by using the pointer image P2.

To be more precise, when the presenter presses a desired spot of the touch panel 321 of the portable terminal 320 with the pointing pen 322, as shown in FIG. 4, the controller 323 of the portable terminal 320 detects the coordinate position of the pressed spot on the touch panel 321 (step S301), converts the coordinate position of the detected pressed spot to the coordinate position of the captured image of the manuscript M (step S302), and generates an indicated position signal used to indicate the converted coordinate position to the controller 316 of the data presentation apparatus 300 (step S303). Next, the controller 323 of the portable terminal 320 attaches the identification signal of the portable terminal 320 to the indicated position signal generated in step S303 (step S304). Next, the controller 323 outputs to the transmission part 324 the indicated position signal to which the identification signal of the portable terminal 320 is attached. The transmission part 324 transmits to the data presentation apparatus 300 the indicated position signal to which the identification signal of the portable terminal 320 is attached. On the other hand, when the viewer presses a desired spot of the touch panel 331 of the portable terminal 330 with the pointing pen 332, the controller 333 of the portable terminal 330 outputs to the transmission part 334 the indicated position signal to which the identification signal of the portable terminal 330 is attached, by way of steps S301 to S304 similar to those of the controller 323 of the portable terminal 320 as shown in FIG. 4. The transmission part 334 transmits to the data presentation apparatus 300 the indicated position signal to which the identification signal of the portable terminal 330 is attached.

Next, as shown in FIG. 5, the receiver 315 of the data presentation apparatus 300 receives each of the indicated position signals to which identification signals of the portable terminals 320, 330 are attached. The controller 316 of the data presentation apparatus 300 detects the identification signal received by the receiver 315. Thus the controller 316 recognizes an indicated position signal transmitted together with an identification signal on a per identification signal basis (step S401). Next, the controller 316 sets the positions of the pointer images P1, P2 to the captured image of the manuscript M based on each of the indicated position signals from the recognized portable terminals 320, 330 (step S402), and generates pointer images P1, P2 (step S403). Next, the controller 316 synthesizes the pointer images P1, P2 generated in step S403 in a position set in step S402 in the captured image of the manuscript M captured therein (step S404) and outputs the image data of the captured image of the manuscript M as a composite image of pointer images P1, P2 to the projector 301. The image data of the captured image of the manuscript M as a composite image of pointer images P1, P2 projected from the projector 301 is displayed on the screen 302.

The presenter uses the portable terminal 320 to operate the pointer image P1 displayed in the captured image of the manuscript M while the viewer uses the portable terminal 330 to operate the pointer image P2 displayed in the captured image of the manuscript M. In this way, the two parties communicate with each other such as performing a question-and-answer session.

According to the data presentation apparatus 300 of this embodiment, an indicated position signal is recognized that is output together with an identification signal output from a portable terminal 320, 330 on a per identification signal basis and displays a pointer image in each position in the image of a manuscript M. This approach allows a presenter and a viewer to use the portable terminals 320, 330 respectively to operate the pointer images P1, P2 corresponding to the portable terminals 320, 330 thereby simultaneously indicating desired positions in the image of the manuscript M in a presentation. This assures a presentation that may be progressed bi-directionally thus smoothly progressing a presentation.

(3) Variations

While the invention has been described in terms of the foregoing embodiments, the invention is not limited thereto but various variations are allowed. For example, while two portable terminals are used in the embodiments, the invention is not limited thereto but any number of portable terminals may be used.

While the portable terminals 320, 330 are used as indication means for operating the pointer images P1, P2 in the embodiments, the invention is not limited thereto. For example, a presenter may use a display 312 instead of the portable terminal 320. In this case, when the presenter presses a spot on the display 312, the controller 316 detects the coordinate position of the pressed spot on the display 312. On this occasion, the controller 316 identifies the display 312 and the portable terminal 330. The controller 316 converts the coordinate position of the pressed spot to the coordinate position of the captured image of the manuscript M, and generates a pointer image P1 in the converted coordinate position. The controller 316 then performs the same processing as that in the embodiments.

For example, the invention may be applied to data presentation apparatus equipped with a light pen as indication means proposed by the applicant instead of a portable terminal (for example, refer to Japanese Patent Application No. 2003-87542 (JP-A-2004-294802)). For example, each of a presenter and a viewer use a light pen including a light-emitting part that emits infrared light at the tip of the pen body instead of the portable terminals 320, 330. The light pen includes an transmission part for originating an identification signal used to identify a light-emitting point of the light-emitting part of the other party. In this case, the light-emitting part of the light pen may also work as an transmission part. For example, the light-emitting part emits infrared rays having different frequencies from each other. The data presentation apparatus 300 may separately comprises, on top of the imaging part 311, an imaging part for a viewer for photographing the viewer similar to the imaging part 311.

In this case, the presenter inserts an optical filter in the imaging optical path of the camera of the imaging part 311 and emits infrared light from the light-emitting part of the light pen, and moves the light pen on the manuscript M. The imaging part 311 then performs motion picture photography of a light-emitting point of infrared light from the light-emitting part. On the other hand, the viewer inserts an optical filter in the imaging optical path of the camera of the imaging part 311 for a viewer and emits infrared light from the light-emitting part of the light pen, and moves the light pen in the photographing visual field of the imaging part for a viewer. The imaging part for a viewer performs motion picture photography of a light-emitting point of infrared light from the light-emitting part. The controller 316 detects an identification signal transmitted from the light pen of each of the presenter and the viewer to recognize the captured image data of the light-emitting point transmitted together with an identification signal on a per identification signal basis. The controller 316 obtains the coordinate position of a light-emitting point on a captured image from the image data of the captured image of a recognized light-emitting point and sets the positions P1, P2 of pointer images on the captured image of the manuscript M and generates the pointer images P1, P2. The controller 116 then performs the same processing as that in the embodiments.

Further, for example, the invention may be applied to a pointing device equipped with a pointer with the camera (image indication device) and a pointer image controller (pointer image control device) (for example, refer to Japanese Patent Application No. 2004-19452 (JP-A-2005-215828)). For example, each of a presenter and a viewer uses a pointer with the camera. The pointer with the camera of the presenter or the viewer includes an transmission part for originating an identification signal used to identify the image data of the captured image of the other party's camera.

In this case, the presenter moves a pointer with the camera and performs motion picture photography of an arbitrary photography target aimed at the presenter by using the camera of the pointer with the camera. The image data of the photography target subjected to motion picture photography is transmitted to the pointer image controller together with an identification signal. On the other hand, the viewer moves a pointer with the camera and performs motion picture photography of an arbitrary photography target aimed at the viewer by using the camera of the pointer with the camera. The image data of the photography target subjected to motion picture photography is transmitted to the pointer image controller together with an identification signal.

The pointer image controller then detects the identification signal thus recognizing the image data of the photography target transmitted together with the identification signal on a per identification signal basis. The pointer image controller obtains the travel amount and travel direction of the photography target from the recognized image data of the photography target and converts the obtained travel amount and travel direction of each photography target to the travel amount and travel direction of the pointer images P1, P2 in the captured image of the manuscript M. The pointer image controller sets the positions of the pointer images P1, P2 to the captured image of the manuscript M based on the converted travel amount and travel direction of the pointer images P1, P2 and generates the pointer images P1, P2. The pointer image controller then performs the same processing as step S404 and subsequent steps by the controller 316 in the embodiments.

Each of the presenter and the viewer may use different indication means from each other chosen from a group of indication means including portable terminals 320, 330, a display 312, a light pen, and a pointer with the camera. For example, the presenter may use the portable terminal 320 while the viewer may use the pointer with the camera.

The invention can be used for a data presentation technique that presents data as an image in a lecture, a seminar and various classes.

It will be apparent to those skilled in the art that various modifications and variations can be made to the described embodiments of the invention without departing from the spirit or scope of the invention. Thus, it is intended that the invention cover all modifications and variations of this invention consistent with the scope of the appended claims and their equivalents.

The present application claims foreign priority based on Japanese Patent Application Nos. JP2005-208821 and JP2005-213137, filed Jul. 19 and 22 of 2005, respectively, the contents of which is incorporated herein by reference.

What is claimed is:

1. A data presentation apparatus having a function to generate a pointer image pointing a position in a presentation image, the data presentation apparatus comprising:
    an image transmission section that transmits an image data of the presentation image to a remote terminal;
    a receiver that receives a control signal to determine a display position of the pointer image in the presentation image, the control signal being transmitted from the remote terminal; and
    an image generation section that generates an image data of a composite image based on the control signal, the composite image comprising the presentation image and the pointer image displayed in the presentation image.

2. The data presentation apparatus according to claim 1, further comprising an imaging device that captures the presentation image.

3. A method for operating a remote terminal for transmitting a control signal of a display position of a pointer image in a presentation image to a data presentation apparatus, the data presentation apparatus having a function to generate the pointer image pointing a position in the presentation image, the method comprising:
    receiving an image data of the presentation image from the data presentation apparatus;
    displaying an image on a display section of the remote terminal based on the image data;

generating the control signal to determine the display position of the pointer image in the presentation image; and transmitting the control signal to the data presentation apparatus.

4. The method for operating a terminal according to claim 3, further comprising:

displaying a pointing area on the display section of the terminal, the pointing area corresponding to an area available for displaying the pointer image in the presentation image; and detecting a coordinate of a point specified in the pointing area and converting the coordinate of the point to a coordinate of the pointer image in an image generated by the data presentation apparatus.

5. A data presentation apparatus comprising:

a plurality of remote indication sections, each outputting a control signal to determine a position in a presentation image displayed on a display device and outputting an identification signal to discriminate the control signal from that of other of the remote indication sections; and a control section that recognizes the control signal and the identification signal with respect to each of the remote indication sections and that controls the display device to display a pointer image at the position in the presentation image based on the control signal.

6. The data presentation apparatus according to claim 5, wherein the pointer image has one of a different color and a different shape from that of other pointer image in the presentation image.

7. The data presentation apparatus according to claim 5, wherein the control section controls the display device to display an image tracing positions in the presentation image based on recognized control signals.

8. The data presentation apparatus according to claim 6, wherein the control section controls the display device to display a pointer image based on the control signal output from one of the indication sections, the pointer image having a different color from that of a pointer image displayed based on the control signal output from another of the indication sections.

* * * * *